United States Patent
Yamada

(10) Patent No.: US 7,470,385 B2
(45) Date of Patent: Dec. 30, 2008

(54) PROCESS FOR PRODUCING CELLULOSE ACYLATE FILM

(75) Inventor: Tsukasa Yamada, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 315 days.

(21) Appl. No.: 10/485,303

(22) PCT Filed: Jul. 31, 2002

(86) PCT No.: PCT/JP02/07799

§ 371 (c)(1), (2), (4) Date: Jan. 30, 2004

(87) PCT Pub. No.: WO03/011590

PCT Pub. Date: Feb. 13, 2003

(65) Prior Publication Data

US 2004/0188881 A1  Sep. 30, 2004

(30) Foreign Application Priority Data

Jul. 31, 2001 (JP) ............................ 2001-231235
Jul. 31, 2001 (JP) ............................ 2001-231236
Aug. 15, 2001 (JP) ............................ 2001-246403

(51) Int. Cl.
B29C 47/06 (2006.01)
D01F 2/00 (2006.01)
C08L 1/08 (2006.01)

(52) U.S. Cl. .................. 264/217; 264/207; 264/212; 524/37

(58) Field of Classification Search .......... 264/207, 264/217, 212, 216; 524/37
See application file for complete search history.

(56) References Cited

U.S. PATENT DOCUMENTS 4,592,885 A * 6/1986 Ichino et al. ........... 264/173.16
4,888,147 A * 12/1989 Mochida et al. ............. 264/207
6,211,358 B1 * 4/2001 Honda et al. ................. 536/64
2004/0077752 A1 * 4/2004 Matsufuji et al. ............ 524/37

FOREIGN PATENT DOCUMENTS

| JP | 8-143708 A | 6/1996 |
|---|---|---|
| JP | 8-207210 A | 8/1996 |
| JP | 10-45950 A | 2/1998 |
| JP | 10-58514 A | 3/1998 |
| JP | 11-254594 A | 9/1999 |
| JP | 2000-317960 A | 11/2000 |

OTHER PUBLICATIONS

Reference: Polymer Properties, Sigma Aldrich, p. 49.*
International Search Report Mailed Nov. 19, 2002 for International Application No. PCT/JP02/07799.
Kokaigiho [Technical report (Japanese)] No. 2001-1745, p. 15, right col., line 1 to p. 16, left col., line 8, Japan Institute of Invention and Innovation, with verified English translation.
Kokaigiho [Technical report (Japanese)] No. 2001-1745, Mar. 15, 2001, p. 15, right col., line 1 to p. 16, left col., line 8, Japan Institute and Innovation, with verified English translation.

* cited by examiner

*Primary Examiner*—Matthew J. Daniels
(74) *Attorney, Agent, or Firm*—Buchanan Ingersoll & Rooney PC

(57) ABSTRACT

A cellulose acylate film is produced by using a cellulose acylate solution and forming a film consisting of two or more layers by the co-casting method. The cellulose acylate to be used is selected so that the association molecular weight of cellulose acylate due to the static light scattering in the solution forming the outer layer becomes smaller than the association molecular weight of cellulose acylate due to the static light scattering in the solution forming the inner layer.

18 Claims, No Drawings

PROCESS FOR PRODUCING CELLULOSE ACYLATE FILM

FIELD OF INVENTION

The present invention relates to a process for producing a cellulose acylate film.

BACKGROUND OF INVENTION

A cellulose acylate film is used in various photographic or optical elements because it is tough and has enough flame retardant properties. In fact, the cellulose acylate film is a representative photographic support. Since having an optical isotropy, the cellulose acylate film is also used in a liquid crystal display device, which has recently extended its market. Typically, the cellulose acylate film is used as a protective film of a polarizing plate or a color filter in the liquid crystal display device.

The cellulose acylate film is generally produced according to a solvent cast method or a melt cast method. The solvent cast method comprises the steps of: casting a solution of cellulose acylate dissolved in a solvent (dope) onto a metal support, and evaporating the solvent to form a film. The melt cast method comprises the steps of: heating cellulose acylate to melt, casting the melted cellulose acylate on a metal support, and cooling it to form a film. The solvent cast method gives a film better in planeness than the melt cast method, and hence is usually adopted in practice. There are many publications describing the solvent cast method. With respect to the solvent cast method, it has been recently studied to shorten the time from the step of casting the dope onto the metal support to the step of peeling the formed film from the support, and thereby to improve the productivity of film forming. For example, Japanese Patent Publication No. 5(1993)-17844 describes a process in which such a concentrated dope is cast on a cooling drum that the time from casting to peeling is shortened.

The solvent used in the solvent cast method is required to not only dissolve cellulose acylate but also satisfy various conditions. The viscosity and the polymer concentration of the solution (dope) should be appropriately adjusted to form a flat plane film having uniform thickness. The dope also should have enough stability. Further, the dope should be easily set to gel. Furthermore, the formed film should be easily peeled from the support. In order to satisfy these requirements, the most appropriate solvent must be selected. Moreover, the solvent should be evaporated easily enough to remain little in the film. Various organic solvents have been proposed as the solvent of cellulose acylate. However, only methylene chloride can satisfy all the above-mentioned requirements. Accordingly, solvents other than methylene chloride have not been practically used.

However, the use of hydrocarbon halides such as methylene chloride has been recently restricted severely to protect the global environmental conditions. Further, having a low boiling point (41° C.), methylene chloride is apt to vaporize in the production process of the film. Accordingly, methylene chloride can cause problems in the working environment. The process is, therefore, conducted in a closed system. However, there is a technical limitation on sealing methylene chloride in the closed system. In consideration of this, it is urgently necessary to search a cellulose acylate-dissolving solvent substituting for methylene chloride.

By the way, acetone, which is a widely used organic solvent, has a relatively low boiling point (56° C.), and hence the process of evaporating acetone does not need large thermal energy. Further, acetone has few problems on the human body and the global environmental conditions, as compared with the chlorinated organic solvents. However, cellulose acylate has a poor solubility in acetone. Cellulose acetate having a substitution degree of 2.70 (acetic acid content: 58.8%) or less can be slightly dissolved in acetone, but the solubility in acetone is further lowered if the substitution degree is more than 2.70. Cellulose acetate having a substitution degree of 2.80 (acetic acid content: 60.1%) or more can be swelled but not dissolved in acetone.

J. M. G. Cowie et al. report in Makromol., Chem., vol. 143 (1971), pp.105, that cellulose acylate having a substitution degree in the range of 2.80 to 2.90 is dissolved in acetone through a specific process. The process comprises the steps of cooling the cellulose acylate (in the reported process the acyl group is restricted to acetyl group) in acetone at a temperature of −80 to −70° C., and warming it to obtain 0.5 to 5 wt. % solution of cellulose acylate in acetone. This method, in which the mixture of cellulose acylate is cooled in an organic solvent to obtain a solution, is hereinafter referred to as "cooling dissolution method". The solution of cellulose acylate in acetone is also reported by K. Kamide et al., Bulletin of Textile Machinery Society, Vol. 34, pp. 57 (1981). The report (written in Japanese) is entitled "Dry spinning process using acetone solution of triacetyl cellulose". In the report, the cooling dissolution method is applied to the art of fiber spinning. The experiments described in the report examine the mechanical strength, the dyeing property and the sectioned shape of the fiber obtained by the cooling dissolution method. In the report, 10 to 25 wt. % solutions of cellulose acetate are used to form a fiber.

With respect to the solvent and the dissolution method of cellulose acylate, the inventors have been studied various matters such as chlorinated and non-chlorinated solvent components of the dope, preparation of the dope and casting process for film formation. As a result, it was confirmed that the productivity of the film greatly depends upon how easily the formed film is peeled from the metal support and how easily the film is conveyed during its being dried, in the case where the film is produced by casting the cellulose acylate solution. In other words, it is important that the film is easily peeled off and that the peeled wet film is rigid enough not to deform in conveying.

SUMMARY OF INVENTION

It is an object of the present invention to produce a cellulose acylate film excellent in both productivity and planeness.

The invention provides a process for producing a cellulose acylate film consisting of two or more layers by using a cellulose acylate solution according to the co-casting method, wherein the association molecular weight of cellulose acylate due to the static light scattering in the solution for forming the outer layer is smaller than the association molecular weight of cellulose acylate due to the static light scattering in the solution for forming the inner layer.

The invention also provides a cellulose acylate film produced through the above process.

The invention further provides the above cellulose acylate film containing silica particles, plasicizer and ultraviolet absorbing agent.

The invention furthermore provides a polarizing plate protective film of the above cellulose acylate film.

When a cellulose acylate film having two or more layers is produced by the co-casting method according to the present invention, the association molecular weight of cellulose acylate due to the static light scattering in the solution forming the outer layer is made to be smaller than that in the solution forming the inner layer. Thereby, a cellulose acylate film improved in both planeness and mechanical strength can be produced.

DETAILED DESCRIPTION OF INVENTION

Preferred starting material for preparing cellulose acylate is, for example, cotton material described in KOKAIGIHO [Technical report (Japanese)] No. 2001-1745, pp. 7, right column, line 26-, an article entitled "4. Cotton material for cellulose acylate", published by Japan Institute of Invention and Innovation.

The above report also describes cellulose acylate in which acetic acid content at 6-position is specifically increased, and such cellulose acylate is also preferably used in the invention. The cellulose acylate in which acetic acid content at 6-position is specifically increased is described below in detail. If cellulose acylate is prepared in the normal manner, the acyl substitution degree at 2- or 3-position is larger than that at 6-position. In contrast, however, the "cellulose acylate in which acetic acid content at 6-position is specifically increased" means cellulose acylate in which the acyl substitution degree at 6-position is larger than that at 2- or 3-position. For preparing that cellulose acylate, the amount of sulfuric acid catalyst used in the acylation step of normal preparation process is preferably reduced while the reaction time for acylation is prolonged. If a large amount of sulfuric acid catalyst is used, a large amount of sulfuric ester is formed between the catalyst and cellulose although the reaction rapidly proceeds. When the reaction is completed, the formed ester liberates to leave hydroxyl. The 6-position is so reactive that the sulfuric ester is more produced at 6-position than at 2- or 3-position. As a result, if a large amount of sulfuric acid catalyst is used, the acyl substitution degree at 6-position is lowered. Therefore, for preparing the above cellulose acylate, it is necessary to use the sulfuric acid catalyst as in a small amount as possible and, at the same time, to prolong the reaction time so that the reaction speed lowered by reducing the catalyst can be compensated.

The cellulose acylate film is preferably produced according to the solvent cast method. In the solvent cast method, a solution in which the cellulose acylate is dissolved in an organic solvent (namely, dope) is used. There is no particular restriction on the organic solvent, but a mixed solvent comprising ketones and esters is preferably used. The ketones and esters preferably have solubility parameters of 19 to 21. Each of them can have a cyclic structure, and can have two or more functional groups.

Examples of the esters include methyl formate, ethyl formate, propyl formate, methyl acetate and ethyl acetate. Methyl acetate is particularly preferred. Examples of the ketones include acetone, methyl ethyl ketone, diethyl ketone, methyl isobutyl ketone, cyclopentanone and cyclohexanone. Acetone, cyclopentanone and cyclohexanone are particularly preferred.

In the following description, the solubility parameter is explained. The solubility parameter is a value defined by the formula: $(\Delta H/V)^{1/2}$ in which $\Delta H$ and $V$ are a molar heat of vaporization and a molar volume of the aimed solvent, respectively. The less different solubility parameters the solvents have, the more they are mixed. The solubility parameter is described in many publications. For example, "Polymer Handbook (fourth edition)", by J. Brandrup, E. H. et. al., VII/671 to VII/714 describes it in detail.

The solubility parameters of representative ketones are as follows: acetone (20.3), methyl ethyl ketone (19.0), diethyl ketone (18.2), diisobutyl ketone (18.0), cyclopentanone (20.9), cyclohexane (20.3), and methyl cyclohexanone (20.1).

The solubility parameters of representative esters are as follows: ethyl formate (19.2), propyl formate (18.4), n-pentyl formate (18.1), methyl acetate (19.6), ethyl acetate (18.2) and n-pentyl acetate (17.6).

From the viewpoint of global environment and working environment, it is preferred for the organic solvent essentially not to contain chlorinated solvent. That means the organic solvent contains chlorinated solvent in an amount of less than 10 wt. %, preferably less than 5 wt. %, more preferably less than 3 wt. %. Further, it is also preferred that no chlorinated solvent such as methylene chloride be found in the resultant cellulose acylate film.

Examples of the alcohol include methanol, ethanol, 1-propanol, 2-propanol, 1-butanol, 2-butanol, cyclohexanol, 2-fluoroethanol and 2,2,2-trifluoroethanol. An alcohol having 6 or less carbon atoms is preferred. Particularly preferred alcohols are methanol, ethanol, 1-propanol, 2-propanol and 1-butanol.

Either chlorinated or non-chlorinated solvents can be practically used in the solvent system. There is no particular restriction on the solvent. The solvent system contains esters in an amount of 40 to 95 wt. %, preferably 50 to 80 wt. %, and the content of ketones is in the range of 5 to 50 wt. %, preferably 10 to 40 wt. % based on the total weight of the used solvents. In the solvent system, the total amount of ketones and esters is preferably 70 wt. % or more. Alcohols are preferably contained in an amount of 2 to 30 wt. % in the solvent system.

Concrete examples of combination of the solvents for the mixed solvent are described in KOKAIGIHO [Technical report (Japanese)] No. 2001-1745, pp. 15, right column, line 1 to pp. 16, left column, line 8, published by Japan Institute of Invention and Innovation. There is no particular restriction on use of chlorinated solvents.

For preparing the cellulose acylate solution, first the cellulose acylate is added to the solvent in a tank while stirred at room temperature, so as to swell with the solvent. The time for swelling is at least 10 minutes, and if it is less than 10 minutes some insoluble residues often remain. Further, for swelling the cellulose acylate well, the solvent is preferably kept at 0 to 40° C. If the temperature is lower than 0° C., the swelling speed is so slow that insoluble residues are liable to remain. On the other hand, if it is higher than 40° C., the cellulose acylate is swelled so rapidly that the solvent cannot fully penetrate into the inside.

After swelling, the cellulose acylate is preferably dissolved according to the cooling dissolution method, the high temperature dissolution method or a combination thereof.

Concrete procedures of the cooling dissolution method and the high temperature dissolution method are described in KOKAIGIHO [Technical report (Japanese)] No. 2001-1745, pp. 24, left column, line 15 to pp. 25, left column, line 9, articles entitled "Cooling dissolution method" and "High temperature dissolution method", published by Japan Institute of Invention and Innovation.

It is relatively easy to prepare the cellulose acylate dope in a low concentration, and hence in some cases a thin dope can be beforehand prepared and then condensed with condensation means. Concrete procedures of the process are described in KOKAIGIHO [Technical report (Japanese)] No. 2001-1745, pp. 25, left column, line 10 to 28, an article entitled "Condensation of solution", published by Japan Institute of Invention and Innovation.

Before casting, the dope is preferably filtrated through a proper filter such as wire net, paper or flannel to remove foreign substances such as precipitated or suspended excess solute, dregs and impurities. Concrete procedures of the process are described in KOKAIGIHO [Technical report (Japanese)] No. 2001-1745, pp. 25, left column, line 29 to right column, line 33, an article entitled "Filtration", published by Japan Institute of Invention and Innovation.

In preparing the cellulose acylate solution, various additives can be added in each step. Examples of the additives include plasticizer, ultraviolet absorber and deterioration inhibitors (e.g., oxidation inhibitor, peroxide decomposer, radical inhibitor, metal inactivating agent, oxygen scavenger, amine), releasing agent and fine particles. Concrete examples of the additives are described in KOKAIGIHO [Technical report (Japanese)] No. 2001-1745, pp. 16, left column, line 28 to pp. 22, right column, the fifth line from the bottom, published by Japan Institute of Invention and Innovation.

The releasing agent plays an important role in the step of peeling the formed film from the metal support. The releasing agent is described in detail in KOKAIGIHO [Technical report (Japanese)] No. 2001-1745, pp. 20, left column, line 34 to pp. 22, right column, the fifth line from the bottom, published by Japan Institute of Invention and Innovation. Particularly preferred compounds are described in KOKAIGIHO [Technical report (Japanese)] No. 2001-1745, pp. 20, right column, the 13th line from the bottom to pp. 21, left column, line 19, published by Japan Institute of Invention and Innovation.

The releasing agent is preferably a compound selected from the group consisting of partly esterified polybasic acids showing acid dissociation index (pKa) values of 1.93 to 4.50 when dissolved in water, alkali metal salts thereof and alkaline earth metal salts thereof. The "partly esterified polybasic acid" means a polybasic acid whose acid moieties are partly esterified. For example, if the poly-basic acid is citric acid, its partly esterified body is citric monoester or citric diester.

As the releasing agent, various acids (e.g., oxalic, succinic and citric acids) are also usable. However, these acids can form salts with alkali metal or alkaline earth metal to precipitate in the solution.

Examples of the releasing agents and their pKa values are as follows: aliphatic multivalent carboxylic acids [monoethyl malonate (2.65), monomethyl malonate (2.65), monopropyl succinate (4.00), monomethyl glutarate (4.13), monomethyl adipate (4.26), monoethyl pimelate (4.31), monomethyl azelate (4.39), monobutyl fumarate (2.85)]; oxycarboxylic acids [monoethyl tartrate (2.89), diethyl tartrate (2.82-2.99), monoethyl citrate (2.87), methyl ethyl citrate (2.87)]; aromatic multivalent carboxylic acids [monoethyl phthalate (2.75), monopropyl isophthalate (3.50), monobutyl terephthalate (3.54)]; heterocyclic multivalent carboxylic acids [monoethyl 2,6-pyridinedi-carboxylate (2.09)]; and amino acids [monoethyl glutamate (2.18)].

Sulfonic and phosphoric materials can be also used in combination with the above releasing agents, to realize satisfying releasing. In consideration of solubility, the sulfonic and phosphoric materials are preferably in the form of surface-active agents. Surface-active agents described in Japanese Patent Provisional Publication No. 61(1986)-243837 can be preferably used. Examples of the surface-active agents include $C_{12}H_{25}O—P(=O)—(OK)_2$, $C_{12}H_{25}OCH_2CH_2O—P(=O)—(OK)_2$ and $(iso-C_9H_{19})_2—C_6H_3—O—(CH_2CH_2O)_3—(CH_2)_4SO_3Na$.

The above acids can be in the form of free acids or salts with alkali metals or alkaline earth metals. Examples of the alkali metals include lithium, potassium and sodium. Examples of the alkaline earth metals include calcium, magnesium, barium and strontium. Preferred alkali metals include sodium, and preferred alkaline earth metals include calcium and magnesium. The alkali metals are preferred to the alkaline earth metals. The alkali metals or alkaline earth metals can be used singly or in combination. Both alkali metals and alkaline earth metals can be used in combination.

The total amount of the acids or salts thereof is determined so that satisfying releasing can be realized and so that the resultant film can have enough transparency. For example, the amount is in the range of $1 \times 10^{-9}$ to $3 \times 10^{-5}$ mol, preferably $1 \times 10^{-8}$ to $2 \times 10^{-5}$ mol (e.g., $5 \times 10^{-7}$ to $1.5 \times 10^{-5}$ mol), more preferably $1 \times 10^{-7}$ to $1 \times 10^{-5}$ mol (e.g., $5 \times 10^{-6}$ to $8 \times 10^{-6}$ mol) based on 1 g of the cellulose acylate. It is normally in the range of $5 \times 10^{-7}$ to $5 \times 10^{-6}$ mol (e.g., $6 \times 10^{-7}$ to $3 \times 10^{-6}$ mol).

The procedures for producing a film from the cellulose acylate solution are described below. The cellulose acylate film of the invention can be prepared by the method and apparatus conventionally used for preparation of cellulose acetate films according to the solvent cast method. For example, first the dope (cellulose acylate solution) prepared in a dissolving tank (pot) is introduced into a stock tank, in which the dope is defoamed and finally prepared. The thus treated dope is then sent from an outlet to a pressure die through a quantitative gear pump of pressing type, which can quantitatively send the dope very preciously, for example, according to rotation of the gear. From a slit of the pressure die, the dope is evenly cast on a metal support running endlessly. When the endless support once rotates and a predetermined peeling point is seen, the insufficiently dried dope film (which is referred to as "web") is peeled from the support. While both sides of the web are fixed with clips to keep the width, the web is transferred and dried with a tenter. The web is then successively dried and transferred with rollers of a drying means to complete drying, and wound up by a winder in a predetermined length. The combination of the tenter and the rollers of drying means is properly selected according to use of the film. For example, in the case where the film used for a silver halide photographic material or for a protective film of electric display is prepared by the solvent cast method, not only the above solvent cast apparatus but also a coating means for providing auxiliary layers such as an undercoating layer, an antistatic layer, an anti-halation layer and a protective layer is often used.

The prepared cellulose acylate solution is cast on a smooth band or drum of metal support. Two or more cellulose acylate solutions are successively or cooperatively cast (co-cast) to form two or more layers. For example, two or more outlets are arranged at intervals along the running direction of the metal support, and from each outlet each cellulose acylate solution is cast to form a layered film. This procedure is, for example, described in Japanese Patent Provisional Publication No. 11(1999)-198285. Otherwise, cellulose acylate solutions can be cast from two outlets to form a film. This procedure is, for example, described in Japanese Patent Provisional Publication No. 6(1994)-134933. Further, the process disclosed in Japanese Patent Provisional publication No. 56(1981)-162617 can be adopted. In that process, a flow of high-viscous cellulose acylate solution is enclosed with a flow of low-viscous one to form a layered flow, and the high- and low-viscous solutions in the layered flow is simultaneously extruded to produce a film. Through the cooperative casting (co-casting) process, the surface of the film is dried to be smooth and consequently the resultant film has a considerably improved surface. The thickness of each layer formed by co-casting is not particularly restricted, but preferably the outer layers are thinner than inner layers. The outer layer has a thickness of preferably 1 to 50 μm, more preferably 1 to 30

μm. Here, the term "outer layer" means a layer not facing the band (or drum) in a two-layered film, or the top or bottom layer in a three- or more-layered film. The term "inner layer" means a layer facing the band (or drum) in a two-layered film, or the layer positioned inside in a three- or more-layered film.

The cellulose acylate solution can be cast simultaneously with coating solutions for other functional layers (e.g., adhesive layer, dye layer, antistatic layer, anti-halation layer, UV absorbing layer, polarizing layer).

The dopes for preparing the outer and inner layers are described below.

As described above, the formed film dried insufficiently must be peeled from the metal support. In a practical procedure, the insufficiently dried film is cooled to gel and is then peeled. If the dope for the outer layer contains cellulose acylate in a smaller association molecular weight than the inner layer, the whole film gels rapidly enough to be conveyed easily. The association molecular weight of cellulose acylate is determined on the basis of static light scattering, and that in the outer layer is preferably in the range of approx. 150,000 to 3,000,000. The association molecular weight in the inner layer is larger than that in the outer layer, and is preferably approx. 1.05 to 20 times as large as that in the outer layer. The second virial coefficient of the dope for the outer layer is preferably in the range of $-2\times10^{-4}$ to $4\times10^{-4}$, and is preferably 1.05 to 10 times as large as that for the inner layer. The inertial square radius of the outer layer is preferably in the range of 20 to 200 nm, and the inertial square radius of the inner layer is preferably 0.2 to 1.05 times as large as that of the outer layer. There are some methods for controlling the association molecular weight. For example, the association molecular weight can be increased by:
(1) adding a poor solvent, (2) shortening the time for conducting the cooling dissolution procedure, or (3) elevating the cooling temperature (for example, $-70°$ C. is changed into $-30°$ C.). If the association molecular weight is increased, the second virial coefficient decreases and the inertial square radius is apt to increase.

In the case where alcohol is incorporated into the cellulose acylate solution, it can be added immediately before casting. A relatively large amount of alcohol is preferably incorporated in the inner layer. If so, the insufficiently dried film as a whole gels also rapidly enough to be conveyed easily. On the other hand, however, the addition of alcohol lowers stability of the solution, so that the solution often whitens and so that precipitate is liable to deposit. Therefore, the alcohol is added immediately before casting, and thereby the solution can be cast before it whitens to form precipitate. The "alcohol is added immediately before casting" means the alcohol is added within 1 hour before casting. The addition of alcohol is preferably carried out preferably within 10 minutes, more preferably within 3 minutes before casting. If the alcohol is added according to the in-line addition, the solution can be cast within 1 minute after the addition. The in-line addition is, therefore, most preferred.

The same amount of alcohol can be added into the outer and inner layers. However, in consideration of gelation and planeness of the whole film, the alcohol is preferably incorporated only or more in the inner layer.

The dope cast on the metal support is dried at a temperature of preferably 30 to 250° C., more preferably 40 to 180° C. in the drying step. The temperature for drying is described in Japanese Patent Publication No. 5(1993)-17844. The film can be laterally stretched by intention. The stretching method is described in, for example, Japanese Patent Provisional publication Nos. 62(1987)-115035, 4(1992)-152125, 4(1992)-284211, 4(1992)-298310 and 11(1999)-48271. The film can be stretched either monoaxially or biaxially. The stretching ratio (ratio of the extended length to the original length) is preferably in the range of 10 to 30%.

The thickness of the dried film is controlled according to use of the film, but is normally in the range of 5 to 500 μm, more preferably in the range of 20 to 250 μm, most preferably in the range of 30 to 180 μm. If the film is used for an optical device, the thickness is particularly preferably in the range of 30 to 110 μm. The thickness can be controlled by adjusting various conditions such as the solid content of the dope, the width of the die slit, the extruding speed from the die, and the moving speed of the metal support.

The cellulose acylate film can be subjected to surface treatment, if needed, to improve adhesion between each functional layer (e.g., adhesive layer, backing layer) and the film. Examples of the surface treatment are described in KOKAIGIHO [Technical report (Japanese)] No. 2001-1745, pp. 32, left column, line 16 to pp. 32, right column, line 42, published by Japan Institute of Invention and Innovation.

For some uses, the film preferably has at least one antistatic layer or a hydrophilic binder layer for enhancing adhesion onto a polarizer. Auxiliary layers which can be provided on the film are described in KOKAIGIHO [Technical report (Japanese)] No. 2001-1745, pp. 32, right column, the 12th line from the bottom to pp. 45, left column, the third line from the bottom, published by Japan Institute of Invention and Innovation.

The cellulose acylate film prepared from the cellulose acylate solution has various uses. The uses of the film are described in KOKAIGIHO [Technical report (Japanese)] No. 2001-1745, pp. 45, right column, the fifth line from the bottom, an article entitled "14. Uses", published by Japan Institute of Invention and Innovation.

EXAMPLES

In the below-described examples, chemical and physical properties of the prepared cellulose acylate solutions and films were measured or evaluated in the following manners.

(0) Substitution Degree (%) of Cellulose Acylate

The acetic acid content was measured according to the saponification method. The sample of dried cellulose acylate was preciously weighed out, and dissolved in a mixed solvent of acetone and dimethyl sulfoxide (4:1, by volume). A certain amount of 1 N-sodium hydroxide aqueous solution was added to the solution, and thereby the cellulose acylate in the solution was saponified at 25° C. for 2 hours. After an indicator of phenolphthalein was added, the excess sodium hydroxide was titrated with 1 N-sulfuric acid (concentration factor: F). Independently, a blank test was carried out in the same manner. From the obtained data, the acetic acid content (%) was calculated according to the following formula:

$$\text{acetic acid content} = \{6.005 \times (B-A) \times F\}/W$$

in which A is the amount (ml) of 1 N-sulfuric acid used in the titration, B is the amount (ml) of 1 N-sulfuric acid used in the blanc test, F is the concentration factor of 1 N-sulfuric acid, and W is the weight of the sample.

In the case where the cellulose acylate contains two or more kinds of acyl groups, the amount of each group was estimated on the basis of differences among the pKa values. Independently, the amount was measured according to another method (described in T. Sei, K. Ishitani, R. Suzuki, K. Ikematsu, Polymer Journal, 17, 1065(1985)), and compared with the above estimated value to confirm that it was correct.

From the obtained acetic acid content and the amounts of other acyl groups, the substitution degree was calculated in consideration of molecular weight.

(1) Viscosity Average Degree of Polymerization (DP) of Cellulose acylate

About 0.2 g of absolutely dried cellulose acylate was preciously weighed out, and dissolved in 100 ml of a mixed solvent of methylene chloride and ethanol (9:1, by weight). Dropping time of the solution was measured at 25° C. by means of Ostwald's viscosity meter, and thereby the degree of polymerization was calculated according to the following formulas:

$$\eta rel = T/T0$$

$$[\eta] = (ln\eta rel)/C$$

$$DP = [\eta]/Km$$

in which
T: dropping time of the sample in terms of second,
T0: dropping time of the solvent alone in terms of second,
C: concentration (g/l), and
Km: $6 \times 10^{-4}$.

(2) Stability of Solution

The prepared solutions or slurries were left at room temperature (23° C.) for 20 days, and then observed and classified into the following four grades A, B, C and D:
A: transparent and homogeneous,
B: slightly clouded, or a little amount of excess solute was seen,
C: gelled, or a considerable amount of excess solute was seen, and
D: not swelled and the solute was not dissolved, and the sample was opaque and inhomogeneous.

(3) Viscosity of Solution

The viscosity of each prepared solution was measured at 0° C. and 50° C. by means of a Rheometer (TA Instruments) equipped with a sensor of Cone-plate type.

(4) Surface of Film

The prepared films were observed to check the state of the surface. According to the observation, the prepared films were classified into the following four grades:
A: the surface was smooth and even,
B: the surface was almost smooth, but unevenness was observed a little,
C: the surface was almost smooth, but weak unevenness was frequently observed,
D: weak unevenness was seen all over the surface, and
E: considerable unevenness was seen, and there were dregs on the surface.

(5) Haze of Film

The haze of each prepared film was measured by means of a haze meter (1001DP type, Nippon Denshoku KK).

(6) Association Molecular Weight, Inertial Square Radius, and Second Virial Coefficient The titled values were measured on the basis of static light scattering in the following manner. Since the measuring apparatus could not analyze a thick solution, the measurement was performed in low concentration ranges. The obtained values, however, reflect behaviors of the dope in a high concentration.

i) The cellulose acylate was dissolved in the solvent used for preparing the dope, to prepare a 0.1 wt. %, 0.2 wt. %, 0.3 wt. % or 0.4 wt. % solution. For preventing the cellulose acylate from absorbing moisture, it was beforehand dried at 120° C. for 2 hours and weighed out at 25° C., 10% RH. The cellulose acylate was dissolved in the same manner (e.g., room temperature dissolution method, cooling dissolution method or high temperature dissolution method) as that for preparing the dope.

ii) The prepared solutions and the solvent were filtrated through a Teflon filter of 0.2 μm.

iii) The static light scattering of each solution or solvent was measured at 25° C. in the angle range from 30° to 140° at intervals of 10° by means of a light scattering spectrophotometer (DSL-700, Otsuka Electronics Co., Ltd.).

iv) The obtained data were analyzed with the application program installed in the spectrophotometer according to the berry plotting method. In the analysis, a refractive index of the solvent measured with an Abbe's refractometer was used. With respect to each measured solution or solvent, the concentration gradient of refractive index (dn/dc) was measured by means of a differential refractometer (DRM-1021, Otsuka Electronics Co., Ltd.).

Example 1

(1-1) Preparation of Cellulose Acylate Solution

Cellulose acylate solutions were prepared according to the following two methods. The components of the solution prepared in each example or comparison example were shown in Table 1 in detail. To each solution, silica particles (size: 20 nm), triphenylphosphate/biphenyldiphenylphosphate (1/2) and 2,4-bis-(n-octylthio)-6-(4-hydroxy-3,5-di-tert-butylanilino)-1,3,5-triazine were added in the amounts of 0.5 wt. %, 10 wt. % and 1.0 wt. %, respectively, based on the amount of cellulose acylate. Further, monoethyl citrate was added as a releasing agent in the amount of 200 ppm based on the amount of cellulose acylate. An inner layer and an outer layer were formed from the thus prepared cellulose acylate solutions having different concentrations. The conditions were also shown in Table 1 in detail.

(1-1a) Cooling Dissolution Method (Represented by "cool" in Table 1)

To the solvent, each cellulose acylate shown in Table 1 was gradually added while stirred well. The mixture was left at room temperature (25° C.) for 3 hours to swell. While moderately stirred, the swelled mixture was cooled to −30° C. at the rate of −8° C./minute and then further cooled to the temperature shown in Table 1. After kept at the temperature for 6 hours, the mixture was heated at the rate of +8° C./minute. When the mixture became sol in a certain degree, it was started to stir the sol. The mixture was then heated to 50° C. to prepare a dope.

(1-1b) High Temperature-High Pressure Dissolution Method (Represented by "High" in Table 1)

To the solvent, each cellulose acylate shown in Table 1 was gradually added while stirred. The mixture was left at room temperature (25° C.) for 3 hours to swell. The swelled mixture was placed in a stainless steel-made air-tight container having a dual structure. Highly pressured steam was led to the outer jacket of the container, and thereby the mixture was heated at the rate of +8° C./minute to the temperature shown in Table 1 and kept at the temperature for 5 minutes under 1 Mpa. Water heated at 50° C. was then led to the outer jacket to cool the mixture at the rate of −8° C./minute to 50° C. Thus, a dope was prepared.

(1-2) Filtration of Cellulose Acylate Solution

The prepared dope was filtrated at 50° C. through filter paper having the absolute filtration precision of 0.01 mm (#63, Toyo Filter Co., Ltd.), and then further filtrated through filter paper having the absolute filtration precision of 0.0025 mm (FHO25, Pole).

(1-3) Production of Cellulose Acylate Film

The dope of (1-2) was cast by means of a casting machine described in Japanese Patent Provisional Publication No. 56(1981)-162617, and dried at 120° C. for 30 minutes. The formed film consisted of two or three layers. The two-layered film comprised an inner layer and an outer layer overlaid in order from the band support, while the three-layered one has a sandwiched structure of an outer layer/an inner layer/another outer layer. The details are shown in Table 1. In forming each film, the casting speed was changed and a corresponding flowing speed of the dope was measured. According to the measured speeds, the dopes were classified into the following three grades:

High: high speed (more than 40 m/minute),
Medium: medium speed (30 to 40 m/minute), and
Low: low speed (less than 30 m/minute).

TABLE 1

|  | Cellulose acylate | | | | Dissolution |
|---|---|---|---|---|---|
|  | Acetyl substitution degree (A) | Acyl of $C_3$ to $C_{22}$ | | DP | method and temperature (° C.) |
|  |  | Acyl group[1] | Substitution degree (B) |  |  |
| Ex. 1 | 2.7 | — | 0 | 310 | Cool, −70 |
| Ex. 2 | 2.6 | Pr | 0.3 | 670 | Cool, −70 |
| Ex. 3 | 2.7 | n-Bu | 0.1 | 440 | High, 160 |
| Comp. Ex. 1 | 2.7 | — | 0 | 310 | Cool, −70 |
| Comp. Ex. 2 | 2.7 | — | 0 | 310 | Cool, −70 |
| Comp. Ex. 3 | 2.7 | — | 0 | 330 | Cool, −70 |
| Comp. Ex. 4 | 2.7 | — | 0 | 330 | Cool, −70 |

| | Layers | Components of mixed solvent[2] | | |
|---|---|---|---|---|
| | | Non-chlorinated (wt. %) | Chlorinated (wt. %) | Alcohol (wt. %) |
| Ex. 1 | Inner | MC, 85 | Not used | MOL, 15 |
|  | Outer | MA/CH, 80/15 | Not used | MOL, 5 |
| Ex. 2 | Inner | MA/CH, 60/30 | Not used | BOL, 10 |
|  | Outer | MA/CH, 60/35 | Not used | BOL, 5 |
| Ex. 3 | Inner | MA/AC, 65/10 | MC, 5 | MOL/BOL, 5/15 |
|  | Outer | MA/AC, 75/10 | MC, 5 | MOL/EOL, 5/5 |
| Comp. Ex. 1 |  | MA/CH, 80/15 | Not used | MOL, 5 |
| Comp. Ex. 2 |  | Not used | MC, 75 | MOL, 25 |
| Comp. Ex. 3 | Inner | MA/CH, 60/15 | Not used | MOL, 25 |
|  | Outer | MA/CH, 60/15 | Not used | MOL, 25 |
| Comp. Ex. 4 | Inner | MA/CH, 60/35 | Not used | BOL, 5 |
|  | Outer | MA/CH, 60/15 | Not used | MOL, 40 |

| | Layers | Dope concentration and thickness of dry film | Association molecular weight, second virial coefficient (×10$^{-4}$) and inertial square radius | Number of layers |
|---|---|---|---|---|
| Ex. 1 | Inner | 18.0 50 μm | 2,400,000 0.05 75 | 2 |
|  | Outer | 18.0 50 μm | 500,000 0.7 40 | |
| Ex. 2 | Inner | 18.5 60 μm | 1,400,000 0.2 50 | 2 |
|  | Outer | 18.0 20 μm | 250,000 0.9 30 | |
| Ex. 3 | Inner | 20.0 45 μm | 3,000,000 −0.03 85 | 2 |
|  | Outer | 18.5 15 + 15 μm | 1,000,000 0.3 50 | |
| Comp. Ex. 1 |  | 16.0 100 μm | 500,000 0.7 40 | 1 |
| Comp. Ex. 2 |  | 16.0 90 μm | 200,000 1.1 20 | 1 |
| Comp. Ex. 3 | Inner | 16.0 60 μm | 3,500,000 0.02 90 | 3 |
|  | Outer | 16.0 15 + 15 μm | 3,500,000 0.02 90 | |
| Comp. Ex. 4 | Inner | 18.0 20 μm | 250,000 1.9 30 | 3 |
|  | Outer | 16.0 15 + 15 μm | 3,700,000 1.02 90 | |

Remarks:
[1] Pr: propionyl, Bt: butyryl
[2] MA: methyl acetate,
AC: acetone,
CP: cyclopentanone,
MOL: methanol,
POL: 1-propanol,
BOL: 1-propanol,
CH: cyclohexane,
AA: methyl acetocetate,
MC: dichloromethane,
EOL: ethanol,
CT: carbon tetrachloride,
HP: n-hepatene Remarks 3) weight percent of cellulose acylate per the total weight percent (1-3) Results The prepared cellulose acylate solutions and films were evaluated in the aforementioned manners. As a result, it was confirmed that the solutions and films of the invention had no problem with respect to stability of the solution, and mechanical and optical characters of the film. On the other hand, there were some defects on the surface of the films for comparison.

Further, the films were subjected to MD or TD stretching by 10 to 30% at 130° C. online in the drying step of the production process or offline after the step, and thereby the retardation was increased to 40 to 160 nm in proportion to the stretching ratio.

It was further confirmed that the prepared cellulose acylate films were advantageously used in a liquid crystal display described in Example 1 of Japanese Patent Provisional Publication No. 10(1998)-48420, a discotic liquid crystal-containing optically anisotropic layer described in Example 1 of Japanese Patent Provisional Publication No. 9(1997)-26572, an orientation layer coated with polyvinyl alcohol, a liquid crystal display of VA type shown in FIGS. 2 to 9 of Japanese Patent Provisional Publication No. 2000-154261, and a liquid crystal display of OCB type shown in FIGS. 10 to 15 of Japanese Patent Provisional Publication No. 2000-154261. The films were also advantageously used as a polarizing plate described in Japanese Patent Provisional Publication No. 54(1979)-016575.

TABLE 2

| | Stability of dope | | Haze | Film | Flowing |
|---|---|---|---|---|---|
| | Outer | Inner | (%) | surface | speed |
| Ex. 1 | A or B | A or B | 0.1 | B | High |
| Ex. 2 | A | A | 0.1 | A or B | High |
| Ex. 3 | A | A or B | 0.1 | A or B | High |
| Comp. Ex. 1 | A or B | | 0.4 | D | Low |
| Comp. Ex. 2 | B | | 0.9 | C | High |
| Comp. Ex. 3 | B or C | B or C | 0.8 | C | High |
| Comp. Ex. 4 | B or C | A | 0.3 | C | Low |

Example 2

(1) Preparation of Cellulose Acylate Solution

A cellulose propionate (acetyl and propionyl substitution degrees: 2.6 and 0.3, respectively; average polymerization degree: 670) was used as the cellulose acylate.

The solvent of the dope for inner layer consisted of methyl acetate, cyclohexanone and butanol in amounts of 55 wt. %, 20 wt. % and 25 wt. %, respectively. The solvent for outer layer consisted of methyl acetate, cyclohexanone and butanol in amounts of 70 wt. %, 15 wt. % and 15 wt. %, respectively. Each solvent contained no non-chlorinated solvent. To each of them, butanol was added 30 minutes before casting.

To a mixture of methyl acetate and cyclohexanone, the cellulose acylate was gradually added while stirred well. The mixture was then left at room temperature (25° C.) for 3 hours to swell. While moderately stirred, the swelled mixture was cooled to −30° C. at the rate of −8° C./minute and then further cooled to −70° C. After kept at the temperature for 6 hours, the mixture was heated at the rate of +8° C./minute. When the mixture became sol in a certain degree, it was started to stir the sol. The mixture was then heated to 50° C. to prepare a dope. Thus, the cellulose acylate was dissolved in the mixed solvent of methyl acetate and cyclohexanone according to the cooling dissolution method, to prepare each of the cellulose acylate solutions for inner and outer layers.

The cellulose acylate concentrations of the solutions for inner and outer layers were 18.5 wt. % and 18.0 wt. % respectively.

The association molecular weight of each solution was measured on the basis of static light scattering. As a result, the association molecular weight of the solution for outer layer determined by the static light scattering was found to be smaller than that of the solution for inner layer.

To each solution, silica particles (size: 20 nm), triphenylphosphate/biphenyldiphenylphosphate (1/2) and 2,4-bis-(n-octylthio)-6-(4-hydroxy-3,5-di-tert-butylanilino)-1,3,5-triazine were added in the amounts of 0.5 wt. %, 10 wt. % and 1.0 wt. %, respectively, based on the amount of cellulose acylate. Further, citric acid was added as a releasing agent in the amount of 200 ppm based on the amount of cellulose acylate.

Each prepared solution was filtrated at 50° C. through filter paper having the absolute filtration precision of 0.01 mm (#63, Toyo Filter Co., Ltd.), and then further filtrated through filter paper having the absolute filtration precision of 0.0025 mm (FHO25, Pole).

As described above, butanol was added in batch process to each solution 30 minutes before its being cast.

(2) Production of Cellulose Acylate Film

The prepared dope was cast by means of a casting machine described in Japanese Patent Provisional Publication No. 56(1981)-162617, and dried at 120° C. for 30 minutes. The formed film consisted of two layers, and had a layered structure of an inner layer/an outer layer overlaid in order from the band support. The thickness of the (dried) inner layer was 60 μm, and that of the outer layer was 20 μm.

(3) Evaluation of Solution and Film

The prepared cellulose acylate solutions and film were evaluated in the same manners as in Example 1. As a result, it was found that the solutions for inner and outer layers had good stability (A), that the film surface was classified into A or B grade and that the haze of the film was 0.1%.

Further, the film was subjected to MD or TD stretching by 10 to 30% at 130° C. online in the drying step of the production process or offline after the step, and thereby the retardation was increased to 40 to 160 nm in proportion to the stretching ratio.

It was further confirmed that the prepared cellulose acylate film was advantageously used in a liquid crystal display described in Example 1 of Japanese Patent Provisional Publication No. 10(1998)-48420, a discotic liquid crystal-containing optically anisotropic layer described in Example 1 of Japanese Patent Provisional Publication No. 9(1997)-26572, an orientation layer coated with polyvinyl alcohol, a liquid crystal display of VA type shown in FIGS. 2 to 9 of Japanese Patent Provisional Publication No. 2000-154261, and a liquid crystal display of OCB type shown in FIGS. 10 to 15 of Japanese Patent Provisional Publication No. 2000-154261. The films were also advantageously used as a polarizing plate described in Japanese Patent Provisional Publication No. 54(1979)-016575.

The invention claimed is:

1. A process for producing a cellulose acylate film comprising two or more layers, comprising casting at least two cellulose acylate solutions according to a co-casting method, wherein the association molecular weight of cellulose acylate determined on the basis of the static light scattering in the solution for forming an outer layer is smaller than the association molecular weight of cellulose acylate determined on the basis of the static light scattering in the solution for forming an inner layer, wherein each cellulose acylate solution comprises a non-chlorine-containing solvent, said non-chlorine-containing solvent being a mixed solvent comprising a ketone having a solubility parameter of 19 to 21 and an ester having a solubility parameter of 19 to 21, and wherein an alcohol is added into only the inner layer immediately before casting, or the alcohol content based on the total amount of the solvents in the inner layer is 2.0 to 6.0 times as large as that in the outer layer.

2. The process for producing a cellulose acylate film, as defined in claim 1, wherein the second virial coefficient of the solution for forming the outer layer is larger than the second virial coefficient of the solution for forming the inner layer.

3. The process for producing a cellulose acylate film, as defined in claim 1, wherein the inertial square radius of the solution for forming the outer layer is smaller than the inertial square radius of the solution for forming the inner layer.

4. The process for producing a cellulose acylate film, as defined in claim 1, wherein the alcohol is an aliphatic alcohol having 6 or less carbon atoms.

5. The process for producing a cellulose acylate film, as defined in claim 1, wherein the alcohol is added according to an in-line addition.

6. The process for producing a cellulose acylate film, as defined in claim 1, wherein the alcohol is added into both of the solution for forming the outer layer and the solution for forming the inner layer.

7. The process for producing a cellulose acylate film, as defined in claim 1, wherein the non-chlorine-containing solvent of at least one of the cellulose acylate solutions comprises the alcohol in an amount of 2 to 30 wt. % based on the total amount of the solvents.

8. The process for producing a cellulose acylate film, as defined in claim 1, wherein a mixture of cellulose acylate and solvent is subjected to a temperature of −80 to −10° C. or 80 to 220° C. so that the cellulose acylate is dissolved in the solvent.

9. The process for producing a cellulose acylate film, as defined in claim 1, wherein the outer layer on at least one side of the cellulose acylate film has a thickness in the range of 1 to 50 μm.

10. The process for producing a cellulose acylate film, as defined in claim 9, wherein the thickness of the outer layer is in the range of 1 to 20 μm.

11. The process for producing a cellulose acylate film, as defined in claim 1, wherein the cellulose acylate film has a multi-layered structure consisting of three or more layers, and the outer layer on at least one side of the cellulose acylate film has a thickness in the range of 1 to 50 μm.

12. The process for producing a cellulose acylate film, as defined in claim 11, wherein the thickness of the outer layer is in the range of 1 to 20 μm.

13. The process for producing a cellulose acylate film, as defined in claim 1, wherein the outer layer on at least one side of the film contains a releasing agent.

14. The process for producing a cellulose acylate film, as defined in claim 1, wherein at least one of the layers contains a releasing agent.

15. The process for producing a cellulose acylate film, as defined in claim 14, wherein the content of the releasing agent is in the range of $1\times10^{-9}$ to $3\times10^{-5}$ mol based on 1 g of cellulose acylate.

16. The process for producing a cellulose acylate film, as defined in claim 14, wherein the releasing agent is selected from the group consisting of partly esterified polybasic acids showing acid dissociation index pKa values of 1.93 to 4.50 when dissolved in water, alkali metal salts thereof and alkaline earth metal salts thereof.

17. The process for producing a cellulose acylate film, as defined in claim 16, wherein the releasing agent is a mixture of compounds selected from the group consisting of two or more partly esterified polybasic acids, alkali metal salts thereof and alkaline metal salts thereof.

18. The process for producing a cellulose acylate film, as defined in claim 16, wherein the releasing agent is a compound or a mixture of compounds selected from the group consisting of: partly esterified oxalic, malonic, tartaric, citric, succinic and glutaric acids; alkali metal salts thereof, and alkaline metal salts thereof.

* * * * *